United States Patent
Wu et al.

(10) Patent No.: US 9,639,414 B1
(45) Date of Patent: May 2, 2017

(54) REMOTE REAL-TIME STORAGE SYSTEM MONITORING AND MANAGEMENT

(71) Applicant: EMC Corporation, Hopkinton, MA (US)

(72) Inventors: Mark Wu, Shanghai (CN); Laila Farouk, Cairo (EG); Elsa Cai, Shanghai (CN)

(73) Assignee: EMC IP Holding Co., LLC, Hopkinton, MA (US)

( * ) Notice: Subject to any disclaimer, the term of this patent is extended or adjusted under 35 U.S.C. 154(b) by 162 days.

(21) Appl. No.: 14/668,902

(22) Filed: Mar. 25, 2015

(51) Int. Cl.
*G06F 11/07* (2006.01)

(52) U.S. Cl.
CPC ........ *G06F 11/079* (2013.01); *G06F 11/0727* (2013.01); *G06F 11/0793* (2013.01)

(58) Field of Classification Search
USPC .......................................................... 714/57
See application file for complete search history.

(56) References Cited

U.S. PATENT DOCUMENTS

| | | | | |
|---|---|---|---|---|
| 6,609,213 B1* | 8/2003 | Nguyen | ............. | G06F 11/2025 709/223 |
| 7,343,453 B2* | 3/2008 | Prahlad | ................ | G06F 3/0605 711/117 |
| 7,376,969 B1* | 5/2008 | Njemanze | ............... | G06F 21/55 709/224 |
| 2003/0145037 A1* | 7/2003 | Von Garssen | ........ | H04W 24/00 709/201 |
| 2006/0053347 A1* | 3/2006 | van Ingen | ........... | G06F 11/0715 714/47.2 |
| 2009/0018875 A1* | 1/2009 | Monatesti | .............. | G06Q 10/06 705/7.26 |
| 2011/0258688 A1* | 10/2011 | Peterson | ................. | G06F 9/542 726/7 |
| 2014/0317444 A1* | 10/2014 | Kushihara | ............ | G06F 3/0653 714/6.22 |
| 2015/0032886 A1* | 1/2015 | Wang | .................. | G06F 11/3006 709/224 |
| 2015/0242264 A1* | 8/2015 | Vibhor | ................... | G06Q 10/06 714/57 |

* cited by examiner

*Primary Examiner* — Kamini Patel
(74) *Attorney, Agent, or Firm* — Barry N. Young

(57) ABSTRACT

A method of monitoring and managing a storage device to detect a fault in a storage group, the storage device having a plurality of storage groups and a plurality of responsible users, and communicating causes of the fault and likely solutions to one or more responsible users, each having an assigned wireless mobile device. Upon a fault occurring, an appropriate responsible user is identifying for the storage group based upon the particular nature of the fault. Following authentication of the storage group, error codes and fault information are transmitted to the wireless mobile device and to a knowledge base which returns to the mobile device information as to possible causes for and solutions to correct the fault.

12 Claims, 4 Drawing Sheets

REMOTE REAL-TIME STORAGE SYSTEM MONITORING AND MANAGEMENT

BACKGROUND

This invention relates generally to remotely monitoring and managing systems, and more particularly to the real-time monitoring and management of data storage and similar systems.

Data storage requirements are growing rapidly in many IT infrastructures. For many businesses and enterprises, data availability is critical, and these entities typically have mechanisms that monitor the status of their storage systems and detect and report faults and errors. During normal business hours, experienced administrators and maintenance personnel are generally present in a data center and can respond to alerts and problems rapidly. However, during non-business hours, the appropriate personnel capable of properly diagnosing and correcting problems may not be present. Moreover, some problems may have a higher level of priority, urgency or complexity necessitating more experienced maintenance personnel or may require supervisory or management decisions, and critical time can be wasted finding the right personnel to address a problem. The situation may also be rendered more complicated by division of responsibility among different departments or personnel. In some systems, storage devices may comprise different storage groups or arrays that are assigned to different administrators or supervisors or which have different priorities. Furthermore, certain types of problems that are more complex may need to be addressed by different levels of supervisors or administrators. When problems arise, it is generally essential to inform quickly the correct persons who are responsible for making decisions so that corrective action may be taken. During non-business hours or the nighttime, finding those correct persons may be difficult, resulting in greater down time or lost data.

It is desirable to provide systems and methods that address these and other problems of monitoring and managing systems, and it is to these ends that the invention is directed.

DESCRIPTION OF PREFERRED EMBODIMENTS

The invention is particularly well adapted for monitoring and managing an enterprise storage system and will be described in that environment. As will become apparent, however, the invention has broader applicability and this is illustrative of only one utility of the invention.

As will be described in more detail below, the invention affords a method and a system that take advantage of the widespread proliferation of wireless mobile communications devices, such as mobile telephones, and the increased processing power of such devices. Mobile devices such as smart phones embody processors and storage capacity that enable them to run mobile applications, as well as to communicate via voice and text over cellular telephone networks and Wi-Fi networks. The invention makes use of these capabilities to communicate status, as well as error notifications, alerts, and information concerning problems, about storage or other computer systems being monitored and managed to appropriate responsible supervisors and other maintenance personnel. The invention preferably operates automatically, continuously and full-time, 24/7. Accordingly, when problems arise, whether during work hours or non-work hours, the appropriate personnel can be promptly notified as to the nature of the problems and possible solutions.

Figure 1:
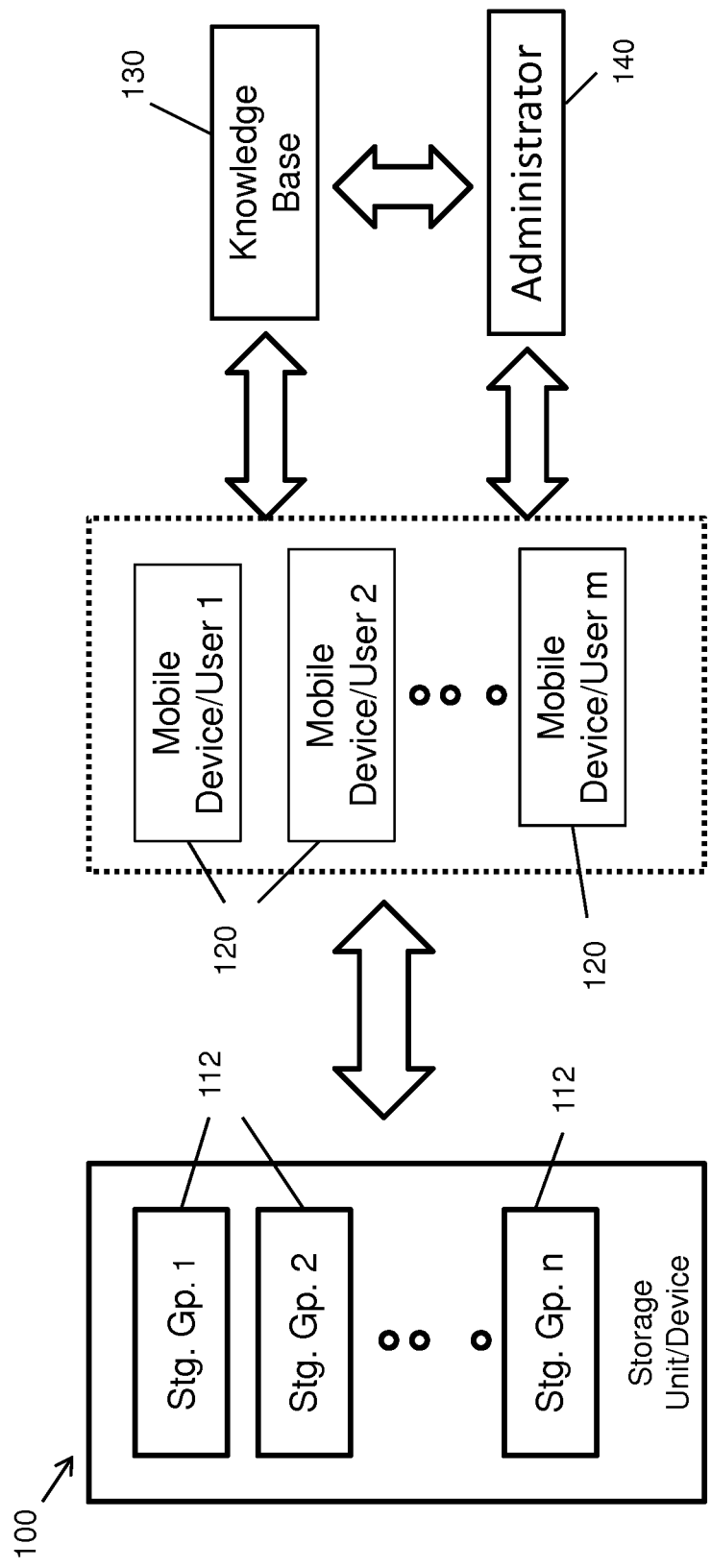
FIG. 1 is diagrammatic overview of an embodiment of a system and method in accordance with the invention for monitoring and managing a storage system.

FIG. 1 is a block diagram providing an overview of a system and method in accordance with the invention for the automatic, continuous, real-time monitoring of a system, such as a data storage or other computer system, and for reporting faults and other errors to appropriate supervisory or management personnel.

Referring to FIG. 1, a computer system may comprise one or more system units 110 which may each be either a stand-alone data storage unit or one of multiple data storage units in a data storage system in an enterprise data center, for instance. System unit 110, which will be referred to as a storage unit or a storage device, may comprise, for instance, a cabinet containing a plurality of hardware storage devices, such as disks with associated disk controllers, processors, memories and applications (not shown explicitly in the figure), arranged in a predetermined number, n, of storage groups 112. Each storage group may have its own processor and memory storing executable instructions for controlling its associated disks. Each storage group 112 may be assigned to a particular department or to a particular function of the enterprise, and each storage group may have one or more maintenance or supervisory personnel who are responsible for the group. One or more processors within the storage unit may execute fault detection and system maintenance software applications that monitor the status and operations of the unit and the components of the storage groups, and report faults and status, as will be described.

Storage unit 110 may interface with the cellular wireless telephone network or other wireless data network (e.g., Wi-Fi) to communicate information to one or more mobile devices 120 of users or other supervisory or administrative personnel. As shown in the figure, there may be a plurality, m, of mobile devices 120 with which the storage groups of the storage unit 110 communicate. The mobile devices may comprise smart phones, tablets, etc., containing processors, memory and communications electronics. As noted above, different users may be responsible for monitoring and managing different storage groups 112, or may be responsible for different types of faults, errors or alerts, or have different permissions relative to a storage group. Thus, depending upon the type of fault, error or alert, the storage unit may identify one or more responsible users for notification. The status monitoring software within the storage unit 110 may generate an appropriate error code and send the error code with other information to the mobile device of the responsible user for the storage group that generated the error code. Additionally, as will be explained in more detail below, the status monitoring and reporting software within the storage unit 110 may routinely monitor and report on the status and operations of various components of the storage groups within the storage unit, such as the amount of storage capacity remaining in disks, I/O rates, etc. Administrators or users may set thresholds, such as storage capacity, and issue alerts when thresholds have been exceeded. Routine status checking and reporting may be done on a periodic schedule, such as every three hours, to keep users informed of operational status and to alert users of possible upcoming problems and other issues.

Accordingly, each storage group 112 within the storage unit 110 may have a list of numbers of one or more mobile devices 120 to which it communicates information. Based upon the nature of the information to be communicated, the storage unit will contact appropriate mobile devices 120 and send error codes and other information. The mobile device 120 that receives the information may communicate the error codes to a knowledge base 130 to obtain information about the specific cause of an error and its possible solution, and may simultaneously inform the administrator. The knowledge base 130 may also comprise a processor and memory for storing executable instructions and applications, and a database that stores maintenance and service information about faults, their corresponding error codes, and to solutions to correct the faults. The mobile device 120 may additionally communicate the error codes and other information received from the storage unit and/or the knowledge base to an administrator 140, which may independently communicate with the knowledge base, so that the administrator may take appropriate action if necessary.

Figure 2:
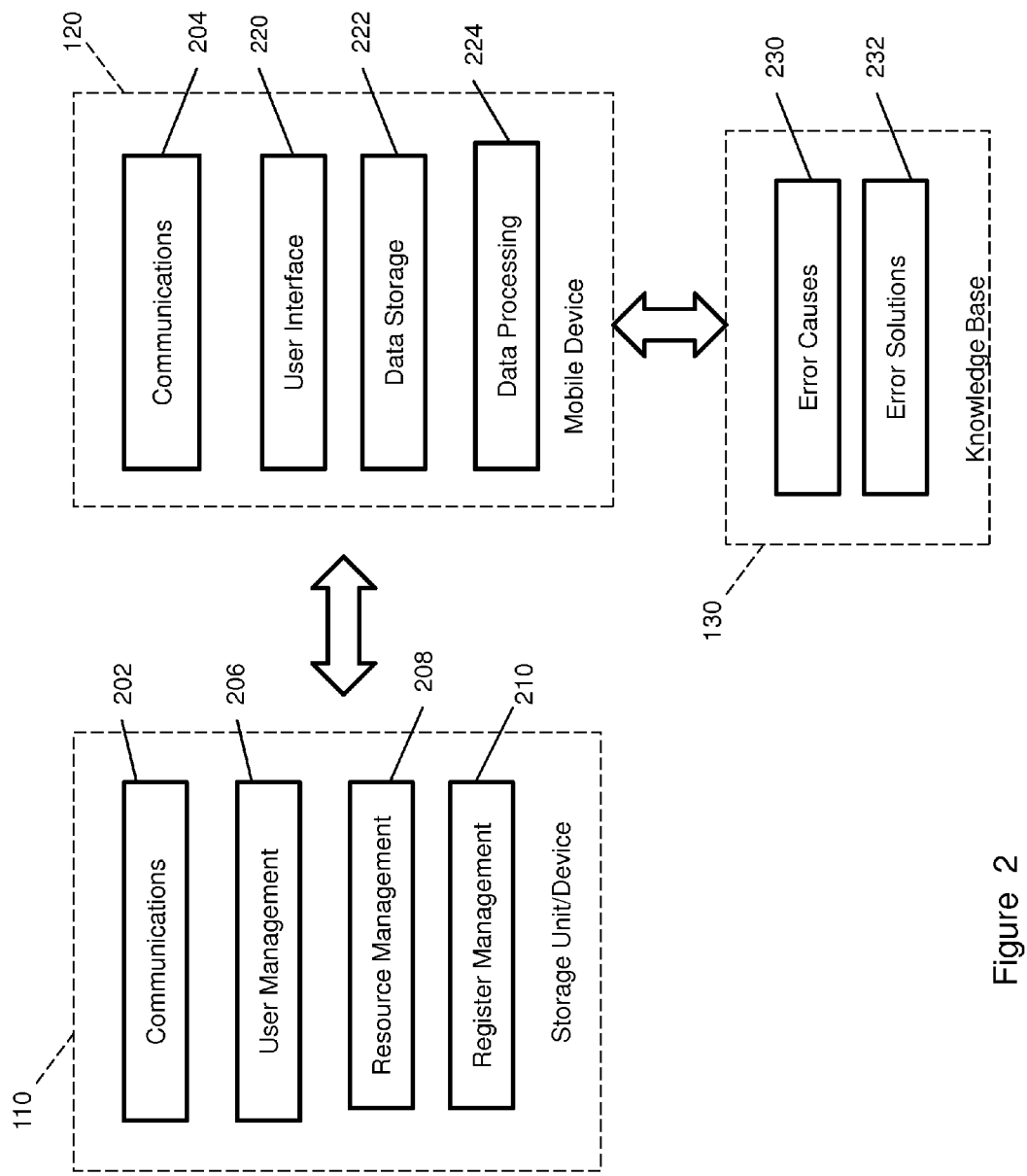
FIG. 2 is a diagrammatic view showing application programs in storage and mobile components of the system of FIG. 1 that interact to monitor and manage the storage system.

As noted above, the storage unit 110, the storage groups 112, the mobile devices 120 and the knowledge base 130 may all comprise computer systems comprising processors and memories for storing executable instructions and applications to control the processors to perform the operations described herein. FIG. 2 illustrates diagrammatically various application modules that may be stored in the memories of the storage unit 110, the mobile devices 120 and the knowledge base 130.

As shown in FIG. 2, storage unit 110 may include a communications application 202 that manages communications between the storage unit (including storage groups and devices) and a corresponding communications application 204 of the mobile devices 120. The storage unit may further comprise a user management application 206 which maintains lists of numbers of mobile devices of users, and associates the numbers with particular storage groups and/or types of problems. As stated above, more than one user may be associated with each particular type of problem or storage group, and the different users may be arranged in order of priority to contact in the event of a problem. A resource management application 208 may be used for storing and organizing information about storage group devices and resources. The resource management application may additionally include status monitoring and fault detection software that controls the periodic status monitoring and fault reporting functions previously described. Finally, a register management application 210 may be used for reregistering the information for mobile devices and users in order to enable the storage unit to communicate with the mobile devices.

Mobile devices 120 in addition to including a communications application 204, may further comprise a user interface application 220 that provides an interface to enable the user of the mobile device to communicate with both the storage unit and the knowledge base 130; a data storage application 222 for managing data stored in the mobile device; and a data processing application 224 that controls the processing of status and error information received from the storage unit and from the knowledge base.

Knowledge base 130 may include an application 230 for processing error codes to determine the causes of errors and faults reported by the storage unit, and may include an application 232 that searches a database within the knowledge base to provide information on possible solutions to correct the errors corresponding to the error codes.

Figure 3:
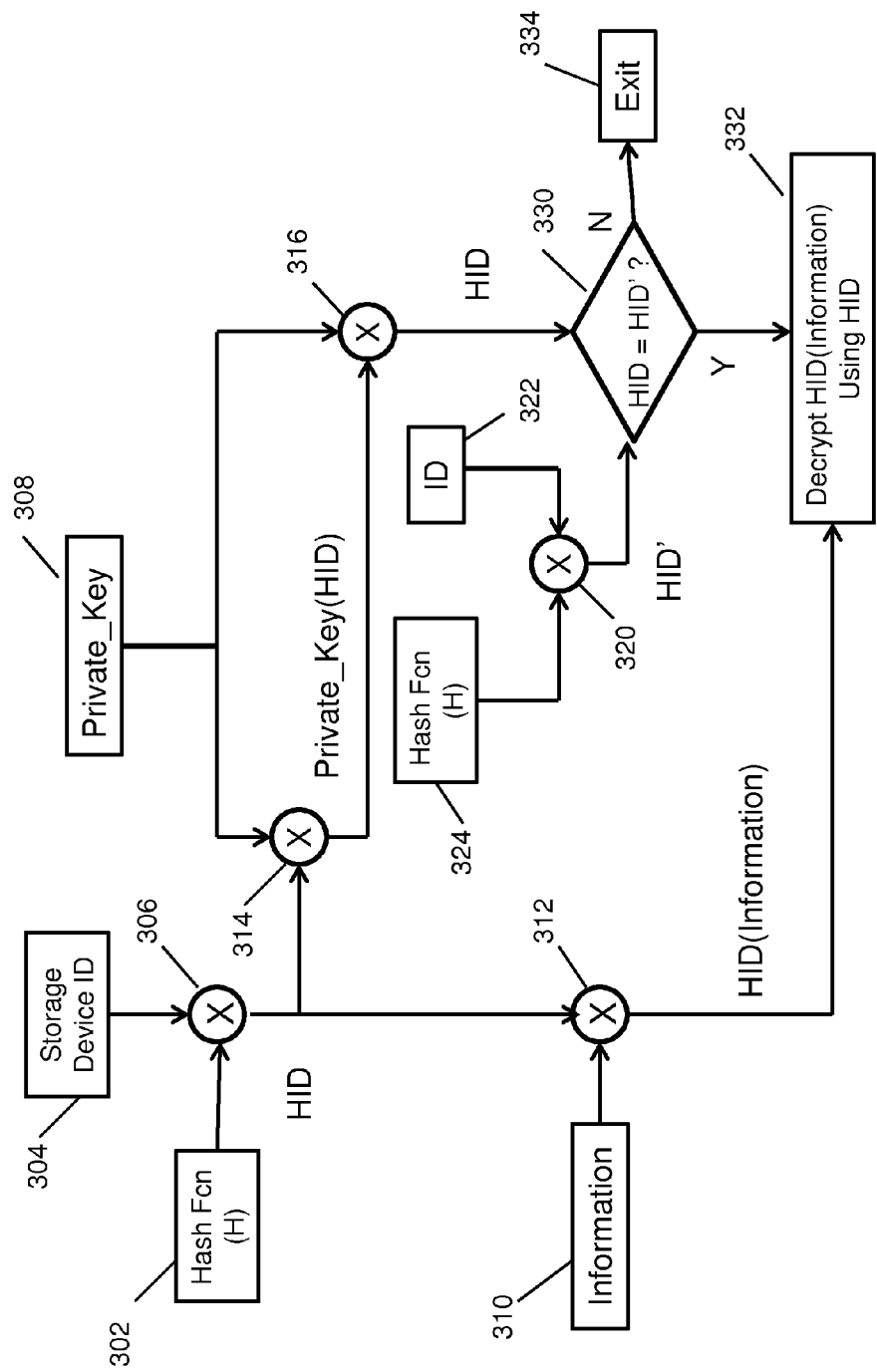
FIG. 3 illustrates a process for authenticating and binding storage system components and mobile devices in accordance with the invention.

As may be appreciated, the applications illustrated in FIG. 2 allow the storage unit and/or the storage groups within the storage unit to communicate with one or more mobile devices to report regular status information about the storage unit and the storage groups, and to store the data in data storage in the mobile device so it can be accessed by the user as desired. The applications further respond to error notifications and alerts issued by the storage unit that are indicative of faults, and communicate with the knowledge base to determine possible causes and solutions which may be presented to the mobile device user. In order for a mobile device to communicate with the storage unit or with storage groups within the storage unit, it is desirable that that mobile device be bound to the storage unit, i.e., authenticated to the storage unit to insure the security of the communications. FIG. 3 illustrates an authentication process in accordance with the invention for accomplishing this.

Referring to FIG. 3, the storage unit and the mobile device perform the process illustrated in order authenticate the storage unit (storage device) to the mobile device and enable communications. The storage device first creates at 306 a hash using a hash function (H) of its storage device ID 304 to calculate HID. The hash function may be MD5, for example. At 312, the storage device encrypts Information 310 using HID as the key to create HID(Information). The storage device additionally encrypts HID at 314 using Private_Key 308 to produce Private_Key (HID) which it provides to the mobile device. The DES encryption algorithm may be used for this purpose. The mobile device and the storage device share Private_Key 308. At 316, the mobile device decrypts Private_Key (HID) using Private_Key to produce HID. At 320, the mobile device creates a hash of ID which was initially provided to the mobile device from the storage device using the same hash function (H) 324 to produce HID'. At 330, the mobile device compares HID decrypted at 316 with HID' produced at 320. If the 2 hashes are equal, this authenticates the storage device to the mobile device in the mobile device at 332 decrypts HID (information) using HID to produce Information. Otherwise, if the two hashes HID and HID' do not match, the mobile device exits at 334. Once the mobile device decrypts the Information, which comprises error codes of messages, the mobile device may send the error codes to the knowledge base to obtain additional information, such as likely causes of the errors and possible solutions to correct them.

Figure 4:
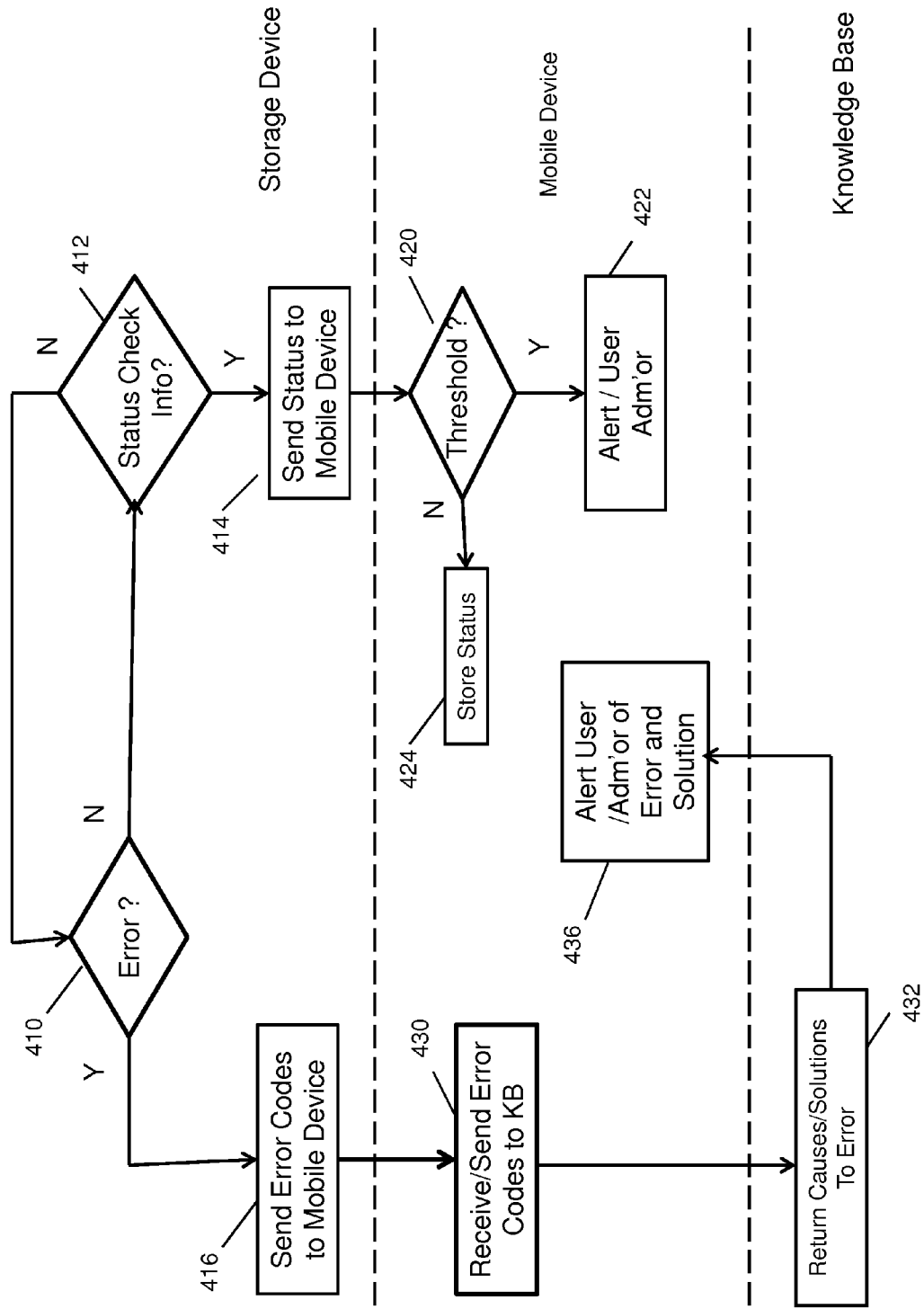
FIG. 4 is a block diagram illustrating a workflow process in accordance with an embodiment of the invention.

FIG. 4 is a block diagram showing an overview of a workflow process in accordance with an embodiment of the invention for processing error codes and other information from the storage device. In the storage device, the status and fault monitoring application may execute in a loop on a predetermined time schedule, such as ever three hours, to monitor and report the status of the storage device and its components. In addition to monitoring regular status, the system may also respond to faults and other errors identified by the fault monitoring application by issuing alerts and associated error codes to one or more appropriate mobile devices. As noted above, different mobile devices and users may be assigned responsibilities for different types of faults, and, depending upon the fault more than one user, e.g., a supervisor, may be responsible and should be notified.

As shown in FIG. 4, upon the status and fault monitoring application encountering an error at 410 or completing a status check, it will send information to the processor of the storage device. At 412, the processor will respond to the information by determining whether it relates to a periodic status check. If so, at 414 the storage device will communicate the status information to the appropriate mobile device after authentication, as described above in connection with FIG. 3. The mobile device may store the status information in its internal memory so it may be accessed by the user as desired. At 412, if the storage device determines that the information is not routine status information, the process returns to 410 where error codes characterizing the errors that caused the alert notice may be sent to the mobile device at 416.

Upon receiving the notice and information from the storage device at 414, the mobile device at 420 determines from the information whether any thresholds have been exceeded. If so, it may provide an alert to the user or to an administrator at 422 with appropriate information to inform the user or administrator of the nature of the exceeded threshold so that the alert may be addressed appropriately. Otherwise, the mobile device may store the status information at 424. If instead, the mobile device receives error codes at 430 from the storage device, it may send the error codes to the knowledge base (KB) to obtain more information. After receiving the error codes from the mobile device, the knowledge base at 432 may use the error codes to search the database and determine the likely causes of the errors and possible solutions to correct them. Additionally, depending upon the nature of the error, the knowledge base may also provide an alert at 436 to a supervisory user or administrator and information as to the likely causes of the errors and possible solutions. Additionally, depending upon the nature of the fault, the knowledge base may provide alternative approaches to correcting the fault.

As may be appreciated, the status and fault monitoring and reporting process of FIG. 4 may run substantially continuously and independently to collect and store normal routine status information, and to alert users and other administrator personnel of faults and other errors that are detected. Accordingly, it provides automatic and unattended real-time monitoring of storage and other similar systems and reporting of status fault information so that problems and issues may be addressed promptly to avoid system downtime and possible data loss.

While the foregoing has been with respect to particular embodiments of the invention, it will be appreciated by those skilled in the art the changes to these embodiments may be made without departing from the principles and the spirit of the invention, which are defined in the appended claims.

The invention claimed is:

1. A method of monitoring and managing a storage device having one or more operating storage groups, each storage group being under the responsibility of a user having an assigned wireless mobile device for communications, comprising:
   monitoring said storage device for a fault in a storage group;
   upon a fault occurring, identifying based upon the type of fault a responsible user from a list of users stored in said storage group;
   authenticating said storage group to the wireless mobile device assigned to the identified responsible user;
   upon authentication, transmitting wirelessly to said wireless mobile device assigned to said identified responsible user information about said fault, said information comprising an error code that corresponds to said fault; and
   determining from a knowledge base using said error code a cause of said fault and a possible solution, wherein said authenticating comprises forming a hash of an ID of the storage device to create a hashed ID, encrypting said information with said hashed ID; encrypting said hashed ID using a private key; decrypting in said mobile wireless device said encrypted hashed ID using said private key; comparing said decrypted hashed ID with a hashed ID created locally in said wireless device; and upon the compared hashed IDs being the same, decrypting said information in using the hashed ID in the wireless mobile device.

2. The method of claim 1, wherein said list of users associates each user on the list with different types of faults, and associates different storage groups with different users.

3. The method of claim 2 further comprising classifying faults according to their characteristics, identifying a supervisory user upon said fault being classified as being severe, and further sending information about said fault classified as being severe to said supervisory user.

4. The method of claim 3 further comprising communicating information about said fault between said knowledge base and said supervisory user.

5. The method of claim 1, wherein said information about a fault is constructed to inform the user of different alternative approaches to correcting said fault.

6. The method of claim 1 further comprising performing status checks on said storage group and its components at predetermined time intervals, and sending at said time intervals reports of such status to the wireless mobile device of said responsible user.

7. A non-transitory computer-readable medium comprising instructions that when executed on a computer system enables monitoring and managing a storage device having one or more operating storage groups, each storage group being under the responsibility of a user having an assigned wireless mobile device for communications, comprising instructions for:
   monitoring said storage device for a fault in a storage group;
   upon a fault occurring, identifying based upon the type of fault a responsible user from a list of users stored in said storage group;
   authenticating said storage group to the wireless mobile device assigned to the identified responsible user;
   upon authentication, transmitting wirelessly to said wireless mobile device assigned to said identified responsible user information about said fault, said information comprising an error code that corresponds to said fault; and
   determining from a knowledge base using said error code a cause of said fault and a possible solution, wherein said authenticating comprises forming a hash of an ID of the storage device to create a hashed ID, encrypting said information with said hashed ID; encrypting said hashed ID using a private key; decrypting in said mobile wireless device said encrypted hashed ID using said private key; comparing said decrypted hashed ID with a hashed ID created locally in said wireless device; and upon the compared hashed IDs being the same, decrypting said information in using the hashed ID in the wireless mobile device.

8. The non-transitory computer-readable medium of claim 7, wherein said list of users associates each user on the list with different types of faults, and associates different storage groups with different users.

9. The non-transitory computer-readable medium of claim 8 further comprising classifying faults according to their characteristics, identifying a supervisory user upon said fault being classified as being severe, and further sending information about said fault classified as being severe to said supervisory user.

10. The non-transitory computer-readable medium of claim 9 further comprising communicating information about said fault between said knowledge base and said supervisory user.

11. The non-transitory computer-readable medium of claim 7, wherein said information about a fault is constructed to inform the user of different alternative approaches to correcting said fault.

12. The non-transitory computer-readable medium of claim 7 further comprising performing status checks on said storage group and its components at predetermined time intervals, and sending at said time intervals reports of such status to the wireless mobile device of said responsible user.

* * * * *